United States Patent [19]

Ferneau

[11] 4,192,541
[45] Mar. 11, 1980

[54] CART HAVING EXTENSIBLE AUXILIARY WHEELS

[75] Inventor: Richard H. Ferneau, Washington Court House, Ohio

[73] Assignee: Burt Weil, Cincinnati, Ohio

[21] Appl. No.: 875,994

[22] Filed: Feb. 8, 1978

[51] Int. Cl.² ............................ A61G 1/02; B62B 3/02
[52] U.S. Cl. ........................................ 296/20; 280/640
[58] Field of Search ................... 296/19, 20; 280/640; 5/81 R, 81 B, 82

[56] References Cited
U.S. PATENT DOCUMENTS

| | | | |
|---|---|---|---|
| 2,304,199 | 12/1942 | Pinnow | 5/82 |
| 3,406,998 | 10/1968 | Rutzen | 296/19 |
| 3,493,262 | 2/1970 | Ferneau | 296/20 |
| 3,637,232 | 1/1972 | Bourgraf | 280/640 |
| 3,759,565 | 9/1973 | Ferneau | 296/20 |
| 3,826,528 | 7/1974 | East | 296/20 |

*Primary Examiner*—Philip Goodman
*Attorney, Agent, or Firm*—Wood, Herron & Evans

[57] ABSTRACT

A cart having a frame, four depending legs adapted to swing rearwardly to a collapsed position, releasable means bracing said legs, an operator for actuating said releasable means, a platform mounted on said frame adapted to move between an extended and a retracted position, auxiliary wheels on the forward end of said platform, and a lock for maintaining said platform in either of its positions.

14 Claims, 7 Drawing Figures

CART HAVING EXTENSIBLE AUXILIARY WHEELS

BACKGROUND OF THE INVENTION

This invention relates to a cart having extensible auxiliary wheels and, more particularly, to a cart having auxiliary wheels mounted on an extensible platform. The cart of this invention is particularly adapted for transporting articles, although the several features of the invention are not necessarily restricted to that use.

The original Weil cart which is the subject of his U.S. Pat. Nos. 2,841,438; 2,877,047 and 2,877,048 included a frame having auxiliary wheels on its forward end, depending legs pivoted to the frame, the depending legs being adapted to swing rearwardly. The objective of the invention was to permit a one-man operation of the cart wherein that man standing at the rear of the cart could roll the cart up to the rear of a vehicle, such as a hearse, ambulance, or station wagon, and while the forward end of the cart was supported by the engagement of the auxiliary wheels on the loading platform of the vehicle, the operator, supporting the rear portion of the cart, could thrust the cart into the vehicle with the legs of the cart swinging rearwardly to lie generally horizontally beneath the frame of the cart.

In U.S. Pat. No. 3,493,262, owned by the assignee of the present application, there is described a cart which is an improvement in the original Weil cart, the improvement residing particularly in the structure of the rear legs. The rear legs are formed of two sections which are hinged together so that upon collapse of the rear legs the upper sections swing forwardly and the lower portions swing rearwardly. This structure permits a shorter overall length of the frame (or a longer wheel base, as the case may be) while avoiding interference with the man at the rear of the cart as the legs are swung rearwardly. In other words, the distance which the rear legs project rearwardly upon collapse is shortened by twice the length of the upper section of the legs over the structure of the original Weil cart. This foreshortened cart was particularly useful in traveling in elevators, in minimizing the projecting structure during sales demonstrations, and, further, for riding in a shorter vehicle space as, for example, a compact station wagon.

SUMMARY OF THE INVENTION

The objective of the present invention has been to provide a cart wherein the overall length of the cart is significantly shorter than even the improved Weil cart described above. The invention thus permits the cart to have the same wheel base as the carts of the original and improved Weil patents for stability while having a shorter overall length. The cart of this invention is thus particularly useful for transport in the rear of subcompact station wagons or station wagons wherein the second rear seat is left up. That is, the invention provides a cart particularly useful for handling inanimate articles, as, for example, heavy articles of merchandise which a salesman may transport from office to customer in the rear of a station wagon having a shorter cargo area length such as the subcompact station wagons being manufactured today both domestically and by foreign manufacturers. Additional advantages of the invention reside in the improved handling ability of the foreshortened cart, as, for example, in traveling in elevators and in turning corners. Alternatively, the invention permits the cart to have a longer wheel base and hence greater stability without increasing the overall length of the original and improved Weil carts.

The foregoing objective of the invention is attained by providing a cart of the type described in which the auxiliary wheels on the forward end of the cart are extensible for loading and unloading of the cart from the vehicle after which they may be retracted thereby significantly shortening the overall length of the cart for either vehicular transport or rolling transport.

More specifically, in the presently preferred form of the present invention the auxiliary wheels are attached to the forward end of the cart platform and are telescopingly seated in the side frame members whereby the entire platform may be easily extended and retracted by the operator from the rear of the cart.

A further improvement has been to provide a releasable lock mechanism for locking the platform in either of its extended or retracted positions to prevent unintended movement of the platform.

Another feature of the invention resides in the structure of the release operator and the interrelationship of the release operator and the cart braces and rearward legs, wherein overcenter hinge pin locations which permit the weight of the cart to maintain the forward and rear legs in a normally extended condition, may be easily overcome by an operator at the rear of the cart to collapse the cart. This enables the cart to be collapsed merely by actuating the release operator and thrusting the forward legs against the rear of the vehicle.

The foregoing features of the present invention have been provided while still retaining the advantages of the improved cart of U.S. Pat. No. 3,637,232. This includes the structure by which the frame is supported on the forward legs when the legs are collapsed so that the cart as a whole, when in the vehicle, is supported by the engagement of the auxiliary wheels and the wheels of the forward legs on the vehicle platform. This relationship enables a man to roll the cart to and from the inside of the vehicle and eliminates the strain which might otherwise be placed upon the man in having to lift the cart and a quite heavy object during the manipulation of the cart to and from the interior of the vehicle.

The several features of the invention will become more readily apparent from the following detailed description taken in conjunction with the accompanying drawings.

DETAILED DESCRIPTION OF THE INVENTION

Figure 1:
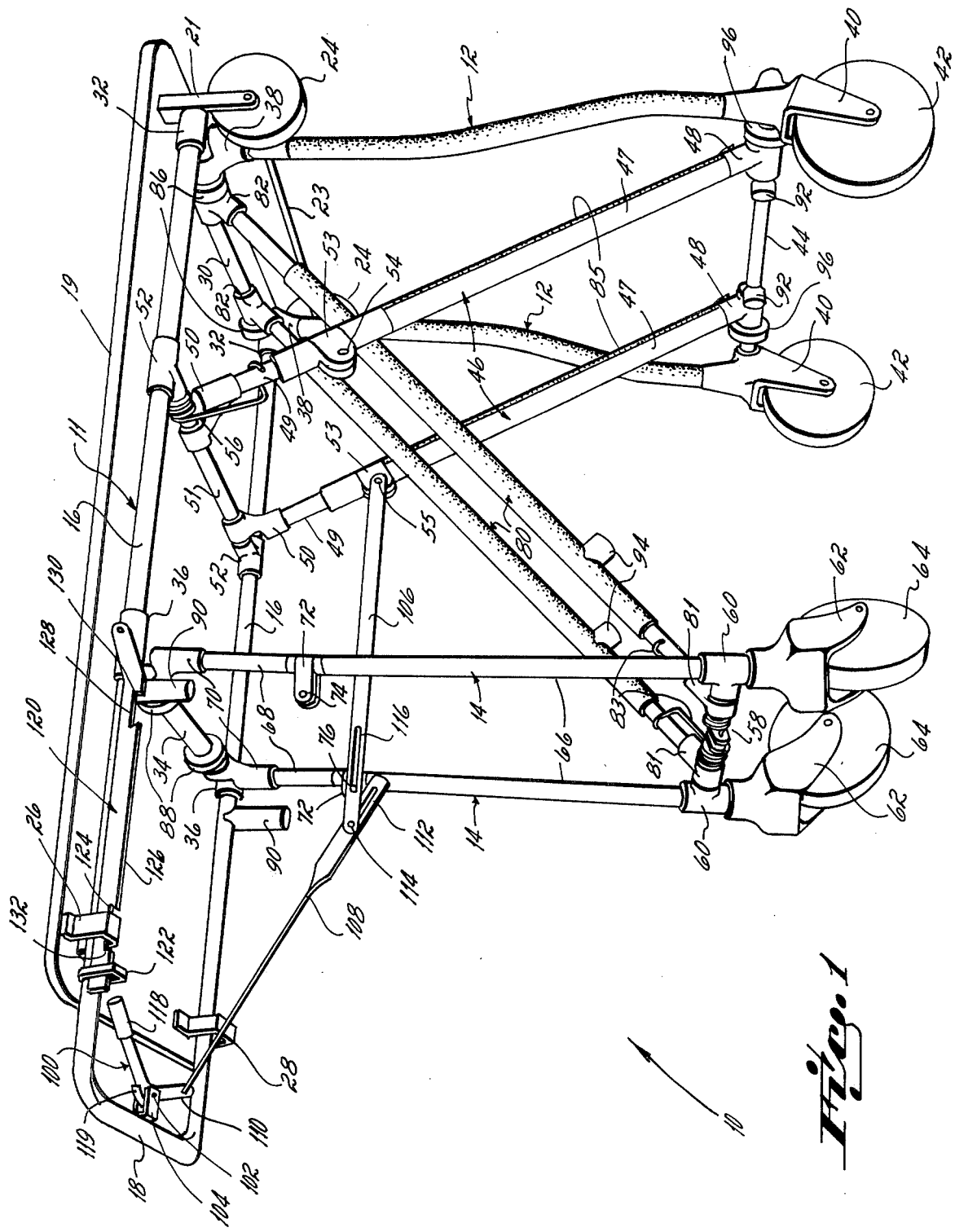
FIG. 1 is a perspective view of the cart of the present invention.

Referring to FIG. 1, the cart 10 includes a frame 11 having depending forward legs 12 and rearward legs 14. The frame 11 is formed of metal tubing formed in the shape of a U to provide two elongated tubular side members 16 and a handle 18 at the rear of the cart. A rectangular platform 19 is mounted on top of the frame 11. At its forward end, the platform 19 is secured by screws 20 (FIG. 2) threaded into wheel yokes 21 which in turn are carried by tubular members 22 (FIG. 2) telescopingly seated in the side members 16. The wheel yokes 21 are interconnected by a transverse auxiliary rod 23 on which the auxiliary wheels 24 are rotatably mounted. Channel-shaped brackets 26 and 28 are attached by bolts 29 (FIG. 2) to the platform 19 at its rear. The brackets 26, 28 permit the platform 19 to telescope freely with respect to the side members 16 as will be explained below, but prevent any substantial transverse movement of the rear of the platform 19.

A transverse bar 30 interconnects the forward ends of the longitudinal side members 16 and is fixed to the members 16 by T-fittings 32. Toward the rear of the frame 11, a transverse bar 34 is journaled in T-fittings 36 secured to side members 16.

Each forward leg 12 is secured at its upper end to a fitting 38, which is rotatably mounted on the transverse bar 30, thereby providing a pivotal axis which enables the legs 12 to swing rearwardly. Wheel yokes 40 are fixed to the lower ends of the legs 12 and carry wheels 42. A lower crossbar 44 is fixed to the wheel yokes 40. Toggle braces 46 have lower sections 47 rotatably mounted by T-fittings 48 to the lower crossbar 44. The braces 46 have upper sections 49 fixed by fittings 50 to a rotatable crossbar 51 mounted by T-fittings 52 to the side members 16 of the frame 11. The upper and lower sections 49 and 47, respectively, are joined together by overcenter hinges 53 having hinge pins 54 and 55 lying outside the centerline of the brace. This overcenter relationship maintains the brace 46 in extended condition until released in the manner to be described below.

A spring 56 wrapped about the crossbar 51 has one end fixed to the crossbar 51 and the other end bearing on the upper section 49 of one of the braces 46, the spring urging the braces and legs 12 toward their extended or upright condition.

The rear legs 14 are interconnected by a crossbar 58, the crossbar 58 being secured by T-fittings 60 at the lower end of the legs 14. Caster yokes 62 are rotatably mounted on the lower ends of the legs 14 and carry caster wheels 64. Each leg 14 has a lower section 66 and an upper section 68. Each upper section is secured to a fitting 70, which is rotatably mounted on the crossbar 34. The lower sections 66 are hinged to the upper sections 68 by overcenter hinges 72, whose hinge pins 74, 76 lie outside of the line 78 drawn between the axis of the crossbar 34 and the axis of the caster wheels 64 (see FIG. 2). This overcenter relationship utilizes the weight of the cart to maintain the rear legs in their extended condition. Diagonal braces 80 are secured to T-fittings 81 and are rotatably mounted to the crossbar 58 on the rear legs 14, and at their upper ends are secured to T-fittings 82 rotatably mounted to the crossbar 30. Springs 83 mounted on the crossbar 58 have one end fixed to the crossbar 58 and the other end bearing on the diagonal braces 80 in such a direction as to tend to maintain the rear legs in their extended or upright condition. The forward legs 12 and the diagonal braces 80 are sheathed in a plastic material such as nylon for their surfaces engage the vehicle, the sheath providing protection to the legs and braces as well as the vehicle. The forward surfaces of the toggle braces 46 are likewise provided with a plastic strip 85 of material such as nylon for these surfaces may also engage the vehicle, the strips providing protection to the braces 46 as well as the vehicle. The overcenter hinges 53 on each diagonal brace 46 and the overcenter hinges 72 on each leg 14 constitute releasable means for holding said legs in a vertical orientation.

The platform 19 is supported on the frame 11 for forward and rearward movement by a pair of forward rollers 86 mounted on the transverse bar 30 and a pair of rearward rollers 88 mounted on the crossbar 34. These rollers may be conveniently formed of a plastic bearing material such as nylon. Mounted on the side members 16 rearwardly of the fittings 70 are downwardly depending posts 90. These posts are aligned with and engage the crossbar 44 of the forward legs 13 when the legs are collapsed as will be explained below. The crossbar 44 further includes a pair of rubber bumpers 92 so aligned as to engage a like pair of rubber bumpers 94 mounted on the braces 80 when the legs are collapsed. Rollers 96, which may be conveniently formed of a plastic bearing material such as nylon, are mounted on the crossbar 44 to aid in rolling the cart on the vehicle platform when the legs are collapsed.

The cart has an operator mechanism including an operating lever 100 pivoted on a bolt 102 secured to a bracket 104 which in turn is fixed to the handle 18, approximately intermediate the side bars 16, a breakdown bar 106 pivotally connected at its one end to the pin 55 of one of the overcenter hinges 53, and a link 108 connecting the other or rearward end of the breakdown bar 106 to one arm 110 of the operating lever 100. The link 108 is pivotally connected at its one end to the arm 110 of the operating lever 100 and its other end contains a slot 112 in which a pin 114 projecting from the rearward end of the breakdown bar 106 slides. The breakdown bar 106 includes a slot 116 which receives the hinge pin 76 of the hinge 72.

Figure 3:
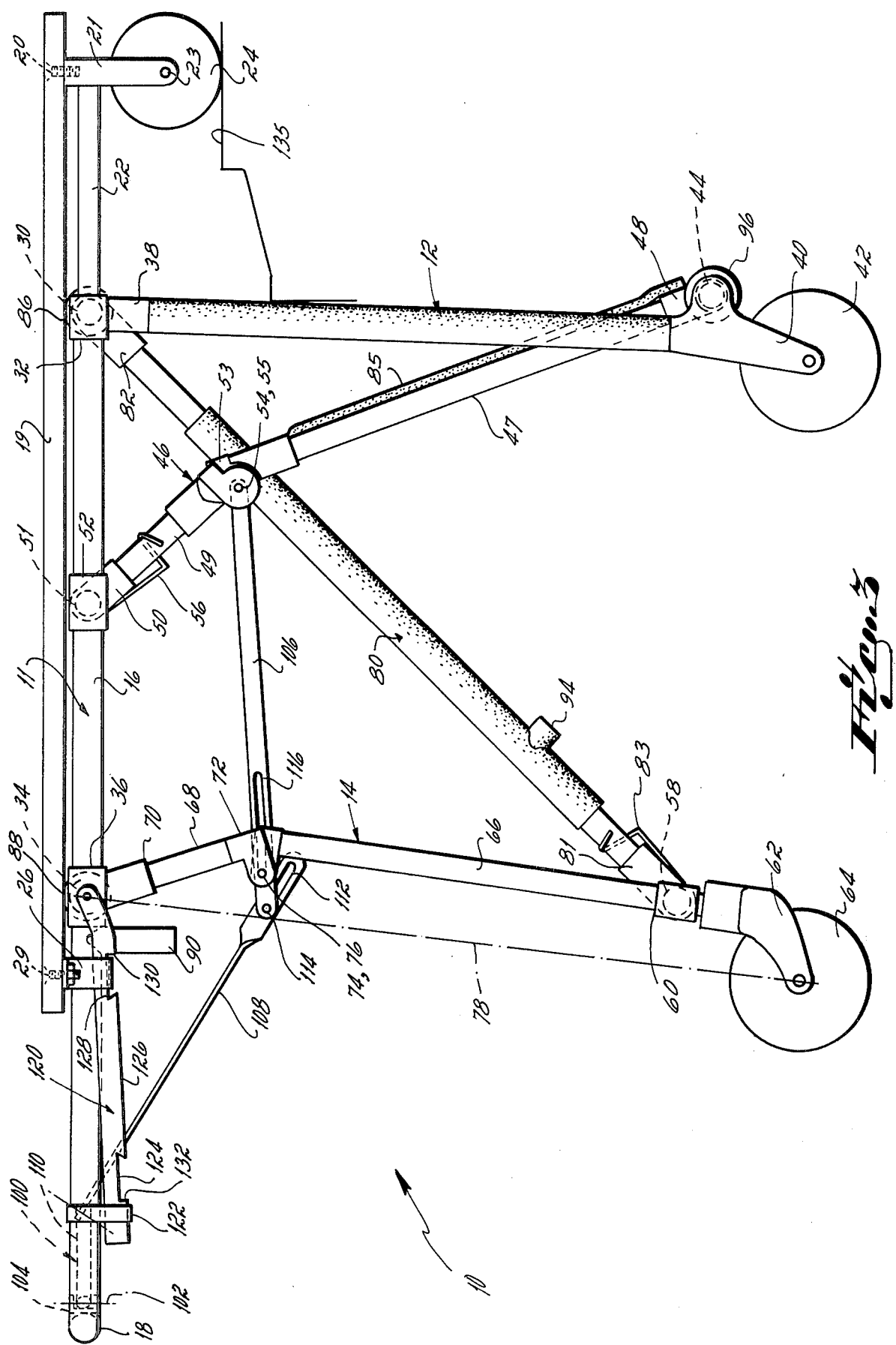
FIG. 3 is a side elevational view of the cart illustrating the initial stage in the collapse of the cart legs as the cart is thrust into a vehicle.

It can be observed from FIGS. 1 and 3 that a man standing behind the handle 18 with his thumb on the handle 18 and his fingers on the handgrip 118 of the operating lever 100 can squeeze the operating lever causing its end 110 to pivot forwardly and in so pivoting to thrust the link 108 in a forward and downward direction. As the link 108 moves, the end of the slot 112 bears against the pin 114 and thereby thrusts the breakdown bar 106 in a forward direction. The breakdown bar thrusts the hinges 53 of the diagonal braces 46 in a forward direction so as to release the braces from their overcenter bracing condition. Simultaneously, the rear end of slot 116 on the rearward end of the breakdown bar 106 bears against the hinge pin 76 of the rear overcenter hinge 72 causing it to move in such a direction as to release the hinges 72 from their overcenter bracing condition thus permitting the frame 11 to collapse. The operator mechanism further includes a spring 119 between the operating lever 100 and the bracket 104 which biases the lever 100 on its pivot 102 to maintain the lever in a normal "unactuated" position until the squeezing force of the man handling the cart overcomes the bias to commence collapse of the cart.

Figure 2:
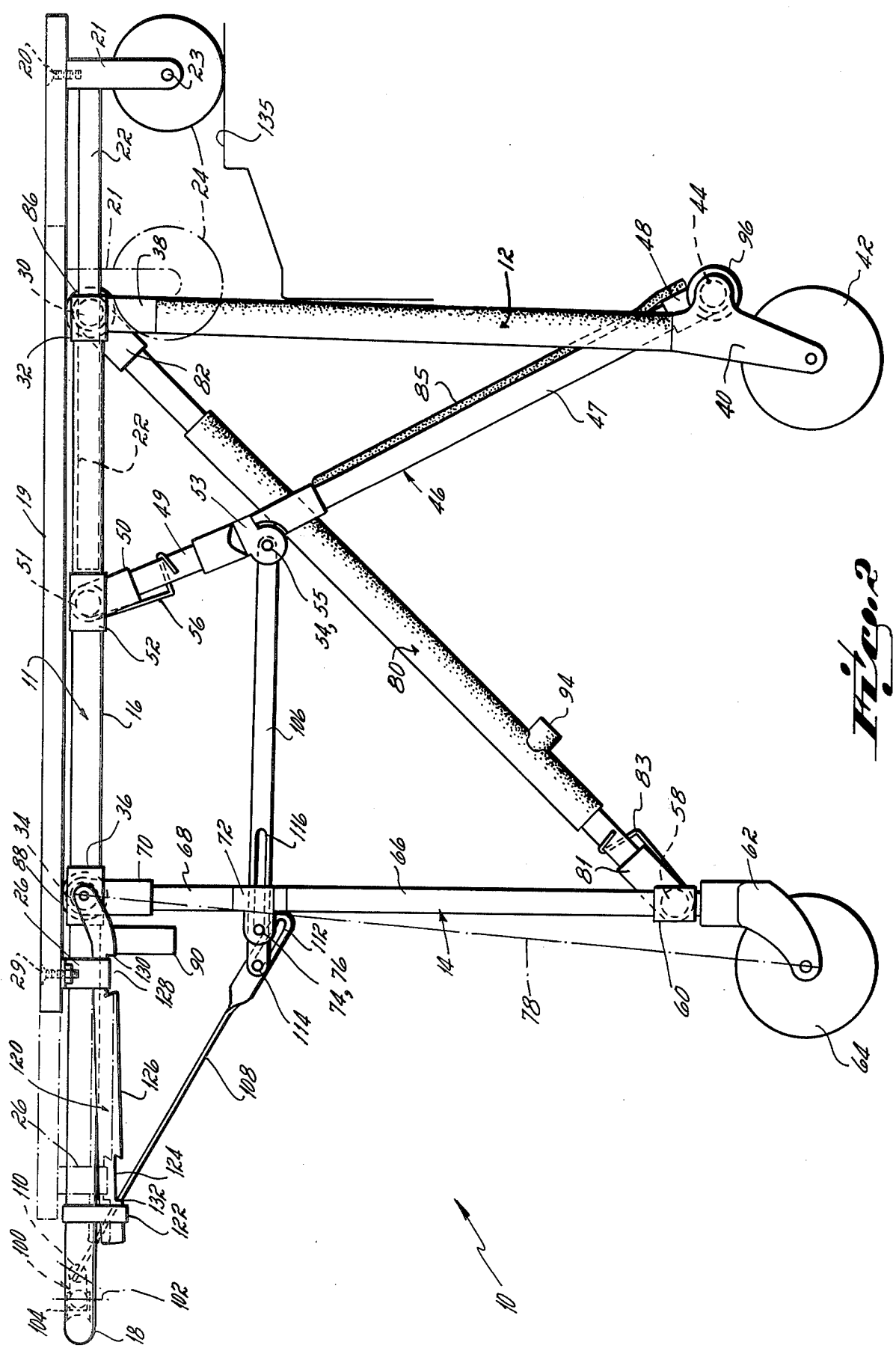
FIG. 2 is a side elevational view of the cart illustrating the auxiliary wheels in their extended position.

The cart has a platform locking mechanism which is best illustrated in FIG. 2. The locking mechanism functions to lock the platform 19 in either its extended or its retracted position. The mechanism includes a locking lever 120 pivotally connected at one end to the T-fitting 36, and its opposite end rests in a guide 122. The locking lever shown operates by gravity, but it may be spring loaded downwardly if so desired. In the platform retracted position as shown in FIG. 1 and shown in phantom in FIG. 2, the bracket 26 attached to the platform 19 engages a notch 124 in the locking lever 120 which prevents forward movement of the platform 19. The notch 124 is conveniently angled in a forward direction to push the lever into greater locking engagement should forward movement of the platform be attempted without releasing the lever. To move the platform to its extended position as shown in solid in FIG. 2, the operator standing behind the handle 18 merely grasps the end of the locking lever resting in the guide 122 raising its bottom edge 126 above the bottom of the bracket 26. The platform is then pushed forward by the operator with his other hand, and the lever is released, its bottom edge 126 riding on the bracket 26 as bracket and platform move forward. On reaching the fully extended position, the bracket 26 falls in a notch 128 at the forward end of the locking lever 120. The notch 128 includes a forward abutting edge 130 which prohibits further forward movement of the platform. The notch 128 is angled in a rearward direction to urge the locking lever to greater locking engagement should the platform be attempted to be retracted without first releasing the lever. To retract the platform, the operator again grasps the end of the lever 120 at the guide 122 and lifts it freeing the bracket 26 from the notch 128. The platform is then pulled back by the operator until the bracket 26 falls into the rearward notch 124 which likewise has an abutting edge 132 to prevent further rearward movement. In this fully retracted position, the wheel yokes 21 contact the open end of the side bars 16. Alternatively, if desired, abutment means could be provided on the underside of the platform to abut any of the transverse bars 30, 34 or 51 to limit either rearward or forward travel of the platform or both.

In the operation of the invention, a man standing at the rear of a loaded cart rolls the cart up to the tailgate of a station wagon, for example, until the auxiliary wheels 24 are about 12 inches from the upper surface 135 of the tailgate or vehicle platform, as the case may be. The platform 19 and the auxiliary wheels 24 are in their fully retracted position as shown in phantom in FIG. 2. This is the normal platform position when the cart is upright and being rolled. When in this position, the man handling the cart grasps the handle 18 with one hand and with the opposite hand raises the lock lever 120 with an index finger. The operator then uses the hand which was grasping the handle 18 to start pushing the platform 19 forward. He releases the lever and continues pushing until the bracket 26 drops into the notch 128, indicating the platform 19 is fully extended and locked in that position. The cart is then rolled forward until both auxiliary wheels 24 are on the tailgate or deck of the station wagon and the forward legs 12 contact the bumper or tailgate. When in this position, the cart is adapted to have its forward end supported by the deck or tailgate of the station wagon and its rearward end supported by the man, and thus he is in condition to effect release of the legs. This position is shown in solid in FIG. 2.

To release the legs, the man at the rear of the cart grasps the handgrip 118 with his fingers while his thumb rests on the handle 18 and squeezes the operating lever 100 while simultaneously pushing the cart forward. Actuation of the operating lever 100 causes the link 108 to be thrust forwardly and downwardly whereby the slot 112 captures the pin 114 on the end of the breakdown bar 106 thereby thrusting the bar 106 in a forward direction. This thrust moves the hinge pin 55 forwardly thus breaking the hinges 53 on the braces 46. Simultaneously, the slot 116 in the breakdown bar 106 captures the hinge pin 76 of the rearward overcenter hinge 72 thereby thrusting it forward to break the hinges 72. These operations thus effect the release of the braces for the front and rear legs. As shown in FIG. 3, these operations move the hinge pin 76 forward of the line 78 between the axis of rotation of the rear wheel 64 and the axis of the crossbar 34 thus permitting collapse of the legs.

Figure 4:
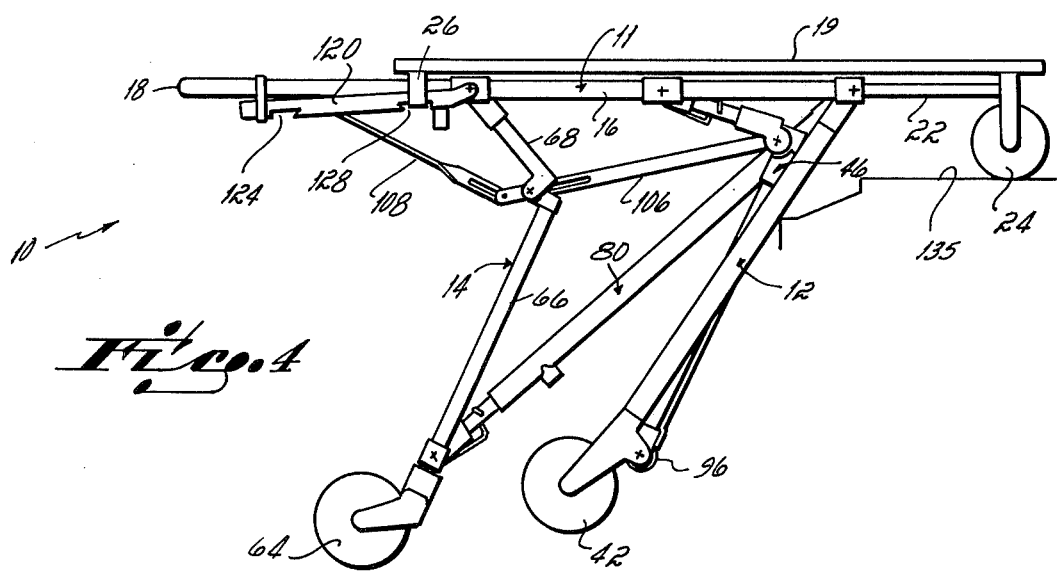
FIGS. 4 through 6 are side elevational views of the cart illustrating the stages in the collapse of the cart legs as the cart is thrust into a vehicle.

The man at the rear of the cart then thrusts the cart forward into the vehicle. During that forward thrust, the front legs engage the tailgate and are forced to swing upwardly and rearwardly toward a collapsed condition. As the forward legs swing upwardly, the upper section 49 of each brace 46 is caused to rotate upwardly. The breakdown bar 106 being attached to the upwardly rotating hinge 53 by the hinge pin 55 is also pulled upwardly thereby causing forward and upward movement of the hinge pin 76 captured in the slot 116. As shown in FIG. 4, at this stage of the collapse of the cart, there is a substantial angulation between the upper and lower sections of the rear legs, that angulation being achieved in part by the operation described above and, in part, by the force applied to diagonal brace 46 when it engages the tailgate of the station wagon.

Figure 5:
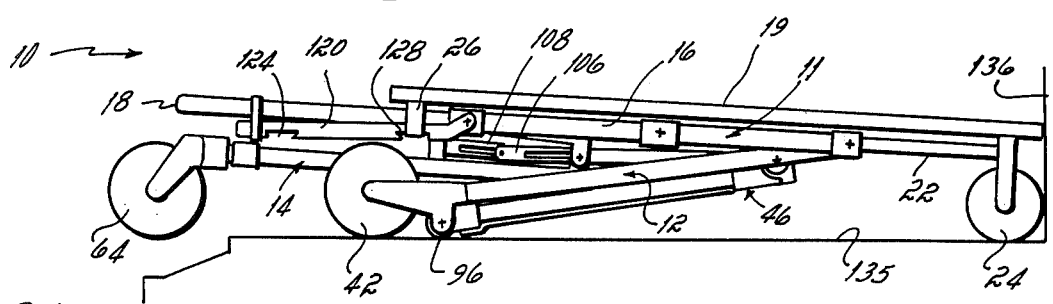
Figure 6:
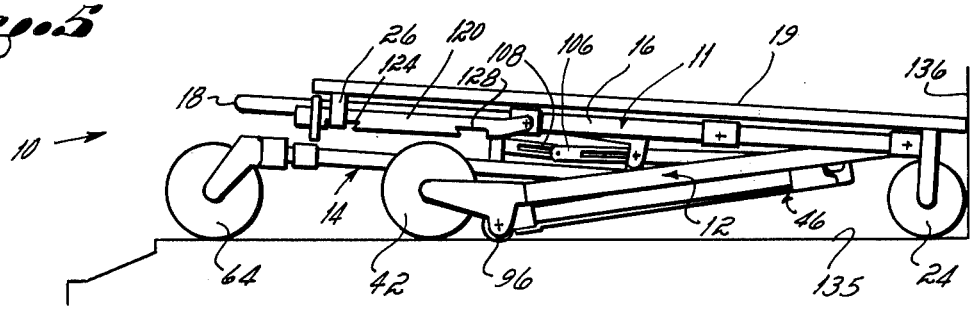
Figure 7:
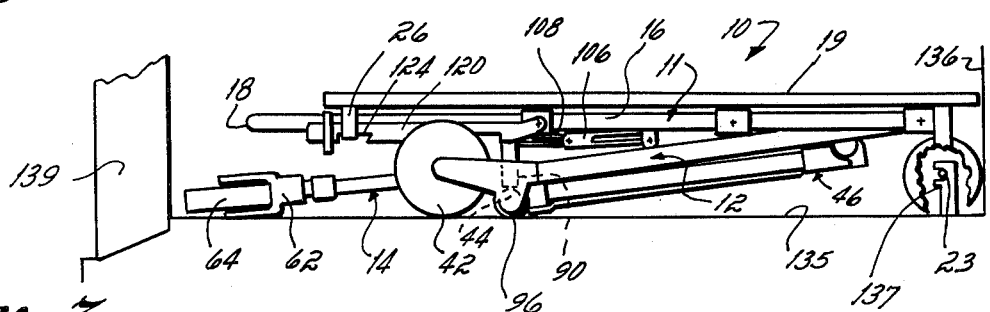
FIG. 7 is a side elevational view of the cart shown in collapsed condition on the vehicle platform.

As the thrust of the cart into the vehicle is continued, the front legs swing past the position illustrated in FIG. 4 until crossbar 44 engages the diagonal braces 80. Thereafter, continued thrust of the cart into the vehicle causes the front and rear legs to swing together to the collapsed position shown in FIG. 5. In this position, the man handling the cart raises the lock lever 120 with his index finger and pushes in on the frame 11 until the bracket 26 falls in the notch 124 of the locking lever 120, indicating that the platform is in its fully retracted position. The cart has now been shortened and should be completely within the vehicle as shown in FIG. 6. In the final stages of obtaining the collapsed condition, the posts 90 depending from the frame engage the forward crossbar 44 as shown in dotted lines in FIG. 7 and the bumpers 92 engage the bumpers 94 so that the weight of the cart and content rest upon the wheels 42 of the forward legs and the front auxiliary wheels 24. The rear caster wheels 64 are swiveled inwardly in the collapsed condition whereby the platform 19 is in a substantially horizontal position. The wheels 42 of the forward legs and the auxiliary wheels 24 along with the rollers 96 provide a rolling support for the cart enabling it to be easily thrust completely in the vehicle and at a later time rolled out of the vehicle. The rollers 86 and 88 provide a rolling support for the platform 19 enabling the frame to be thrust forwardly under the platform 19 while the platform remains stationary.

In the embodiment shown in FIGS. 4–7, the cart 10 is thrust up against the rear vehicle seat 136. Alternatively, a stop bracket 137 bolted to the deck of the station wagon at a distance forward of the tailgate sufficient to enable the tailgate to be closed when the rod 23 of the cart engages the stop may be provided. Thus when the tailgate 139 is swung upwardly to its closed condition, it confines the cart in a secure position between the tailgate and the stop. Alternatively, the stop could be provided with a locking means engaging the rod 23 to prevent rearward movement of the cart during movement of the vehicle.

In removing the cart from the vehicle, the tailgate is lowered, the platform locking lever is released and the frame 11 is pulled out until the platform and auxiliary wheels are in their fully extended position. The cart is then loaded slowly out, being supported by the extended auxiliary wheels in front and the operator in the rear, until the legs pass beyond the tailgate wherein their weight coupled with the springs urge them to an extended position, causing them to snap abruptly to the extended position illustrated in FIG. 2. In this position, the operator lifts the locking lever and retracts the platform until the bracket 26 falls in the notch 124 indicating the platform is in its fully retracted and locked position. The cart is now wheeled away from the vehicle.

I claim:

1. A cart comprising in combination:
a generally horizontal frame,
a platform mounted on said frame for supporting an article,
forward and rearward legs depending from said frame and having wheels at their lower ends,
auxiliary wheels mounted at the forward end of said frame, said auxiliary wheels normally disposed adjacent to said forward legs,
means mounting said auxiliary wheels to said frame to permit said auxiliary wheels to be slidably projected a substantial distance forward of said forward legs,
releasable means normally fixing said legs in perpendicular relation to said frame, and
an operator mounted on said frame for releasing said releasable means to permit said legs to swing rearwardly to a folded position beneath said frame when said auxiliary wheels are projected forwardly and are resting on a vehicle deck as the cart is thrust into a vehicle, said auxiliary wheels adapted to retract after said cart is thrust into a vehicle.

2. A cart according to claim 1 further comprising means for mounting said auxiliary wheels to said platform.

3. A cart according to claim 1 wherein said auxiliary wheels comprise a pair of wheels, one being telescopingly mounted on each side of the cart.

4. A cart according to claim 1 further comprising releasable locking means for locking said auxiliary wheels in their extended and their retracted positions.

5. A cart according to claim 1 wherein said legs depend generally vertically from said frame.

6. A cart comprising in combination:
a generally horizontal platform for supporting an article,
a generally U-shaped tubular frame supporting said platform and having a forward end and a rearward end,
forward and rearward legs depending generally vertically from said frame and having wheels at their lower ends,
auxiliary wheels mounted to said platform at the forward end of said frame in a perpendicular downwardly depending relation to said platform, said auxiliary wheels normally disposed adjacent to said forward legs, said platform and auxiliary wheels being adapted to be extended in a longitudinal direction to project said auxiliary wheels well beyond said forward legs,
releasable means normally fixing said legs in perpendicular downwardly depending relation to said frame, and
an operator mounted on the rearward end of said frame for releasing said releasable means to permit said legs to swing rearwardly as said auxiliary wheels are projected forward and are resting on the deck of a vehicle and the cart is thrust into a vehicle.

7. A cart according to claim 6 in which said tubular frame is open at said forward end and in which said frame includes two longitudinally extending tubes, one being telescopingly seated in the open end on each side of the cart, the ends projecting from said frame being connected to said auxiliary wheels.

8. A cart according to claim 6 further comprising releasable locking means for locking said platform and said auxiliary wheels in said extended and retracted positions.

9. A cart according to claim 6 wherein said releasable locking means comprises a locking lever pivotally mounted at its forward end to said frame, its rearward end being in proximity to the rearward end of said frame, and having a forward and a rearward notch for receiving in locked relation means attached to said platform and movable therewith, said forward notch defining the extended position and said rearward notch defining the retracted position of said platform.

10. A cart according to claim 6 further comprising rollers mounted on said frame for supporting said platform on its underside for movement in said longitudinal direction.

11. A cart comprising in combination:
a generally horizontal frame,
a platform mounted on said frame for supporting an article,
forward and rearward legs depending from said frame and having wheels at their lower ends,
auxiliary wheels mounted in a perpendicular, downwardly depending relation from said platform and being mounted at the forward end of said frame, said auxiliary wheels normally disposed adjacent to said forward legs,
means mounting said auxiliary wheels to said frame to permit said auxiliary wheels to be projected a substantial distance forward of said forward legs,
releasable means normally fixing said legs in perpendicular relation to said frame, and
an operator mounted on said frame for releasing said releasable means to permit said legs to swing rearwardly to a folded position beneath said frame when said auxiliary wheels are projected forwardly and are resting on a vehicle deck as the cart is thrust into a vehicle, said auxiliary wheels adapted to retract after said cart is thrust into a vehicle.

12. In a cart for conveying and demonstrating heavy articles comprising:
a generally horizontal platform for supporting said articles,
a generally U-shaped tubular frame supporting said platform and having a forward end and a rearward end having a handle,
a pair of forward legs pivoted at their upper end to said frame for rearward swinging movement and having a crossrod interconnecting said forward legs at their lower ends,
a rearward pair of legs formed in upper and lower leg sections interconnected by overcenter hinges and having a crossrod interconnecting the lower leg sections at their lower ends, said upper sections being swingable toward said forward end of said frame and said lower sections being swingable toward said handle, a pair of diagonal braces pivoted between the forward end of said frame and said crossrod of said rear legs, a pair of diagonal toggle braces having upper arms pivoted to said frame intermediate said ends thereof and lower arms connected to the crossrod of said front legs, said upper arms being swingable toward the forward end of said frame and said lower arms being swingable toward said handle, said braces normally fixing said legs in a perpendicular downwardly depending relation to said frame and platform, and release means connected between said frame, said rear legs and said toggle braces whereby as said rear legs and said toggle braces are released as said cart is thrust into said vehicle, said front legs will swing rearwardly and thereafter said rear legs will swing rearwardly and said toggle braces will collapse in a V with all said legs and braces lying close to said frame, the improvement comprising:

a pair of auxiliary wheels at the forward end of said frame, said auxiliary wheels normally disposed adjacent to said forward legs, and means mounting said auxiliary wheels to said frame and to said platform in a perpendicular downwardly depending relation to said platform, said auxiliary wheels being extensible and retractable in a longitudinal direction whereby said auxiliary wheels may be extended a substantial distance forward of said forward legs for loading and unloading of said cart from a vehicle to support said forward end of said frame.

13. A cart according to claim 12 in which said frame includes at its forward end two longitudinally extending telescoping tubes, one on each side of the cart, the ends projecting from said frame being attached to said means mounting said auxiliary wheels to said platform.

14. A cart according to claim 12 further comprising releasable locking means for locking the platform and auxiliary wheels in an extended and a retracted position.